UNITED STATES PATENT OFFICE.

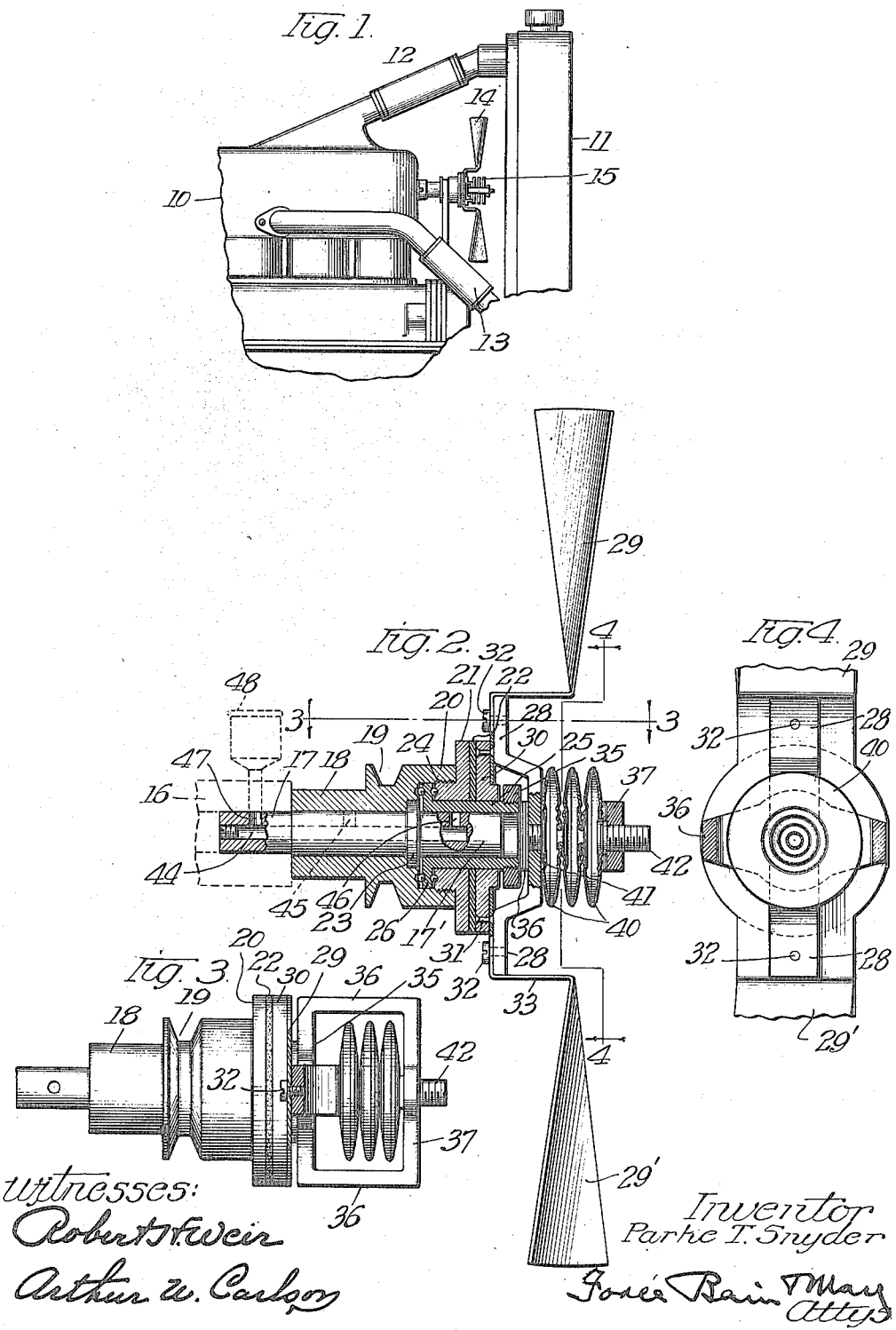

PARKE T. SNYDER, OF CHICAGO, ILLINOIS, ASSIGNOR OF ONE-HALF TO ROSS J. BEATTY, OF CHICAGO, ILLINOIS.

AUTOMATICALLY-CONTROLLED FAN.

1,233,518.   Specification of Letters Patent.   Patented July 17, 1917.

Application filed April 18, 1916. Serial No. 91,906.

*To all whom it may concern:*

Be it known that I, PARKE T. SNYDER, a citizen of the United States, residing at Chicago, in the county of Cook and State of Illinois, have invented certain new and useful Improvements in Automatically - Controlled Fans, of which the following is a specification.

My invention relates to cooling fans and means responsive to variations in the temperature of the air moved thereby, for controlling the volume of air displaced.

It is an undisputed fact that a properly lubricated internal combustion engine operates at its highest efficiency when the cooling water is in the neighborhood of 200° F. Since automobile radiators are necessarily limited as to size it is customary to provide a fan in order to prevent an increase in cooling water temperature to the boiling point when the engine is working under maximum load, or at maximum speed. The natural result is a material decrease in efficiency when operating at low speeds and light load due to over cooling of the circulation water. Furthermore, the constantly operating fan acts as a positive efficiency reducer in cool weather, and for a considerable time after starting an engine which has been idle long enough to become cool.

The principal object of my invention is to maintain the temperature of the cooling water of a gas engine at the most desirable point irrespective of engine load or speed, and this I accomplish by the combination with a cooling fan of a means responsive to temperature variation for controlling the volume of air displaced by the fan.

A further object of my invention is to control the volume of air displaced by the fan through means responsive to changes in the temperature of the air in the vicinity of the cooling radiator.

The invention, though particularly suited for increasing the efficiency of the cooling systems of motor cars when working under varying conditions, is obviously susceptible of use in combination with fluid circulating fans or pumps used for other purposes.

The present application is directed particularly to the embodiment of the invention illustrated in Figures 1, 2, 3 and 4 of my copending application filed on an even date herewith and entitled "Cooling fans and controlling means."

Other and further objects of my invention will become readily apparent to persons skilled in the art, from a consideration of the following description taken in conjunction with the drawings, wherein:—

Fig. 1 is a side elevation of a fragment of an internal combustion engine and radiator showing my automatically controlled fan in position.

Fig. 2 is an enlarged vertical axial sectional view through the fan and controlling means.

Fig. 3 is a transverse sectional view taken on line 3—3 of Fig. 2.

Fig. 4 is a sectional view taken on line 4—4 of Fig. 2.

In all the views the same reference characters are employed to indicate similar parts.

In general the structures illustrated comprise a pulley wheel belted or geared to a rotating part of an engine, the fan blades mounted at the rear of the automobile radiator and arranged for driving connection by the pulley, and a temperature responsive element arranged to control the capacity of the fan blades for drawing air through the apertures in the radiator.

In the drawing I have illustrated a thermostatically actuated clutch for connecting the fan with its driving pulley. Above a predetermined temperature the clutch is closed and the fan rotates at the same speed as its pulley, whereas a drop in temperature causes contraction of the thermostat diaphragms and a consequent separation of the clutch surfaces.

Referring to the drawings I have indicated at 10 an internal combustion engine, in front of which is mounted a water cooling radiator 11, suitably connected to the engine by water circulating pipes 12 and 13. A cooling fan indicated in general at 14 for drawing air through the air cells of the radiator is suitably mounted between the engine and radiator, a belt 14′ driven from the engine supplying power for its rotation. The temperature responsive device 15 is associated with the fan for controlling its operation.

More specifically, as shown in Fig. 2, 16 is a part of the engine frame in which is fixed a bearing stud 17. Rotatable upon the stud 17 is a collar, hub, or sleeve 18 provided with a belt groove 19 and having an extended internally counterbored and threaded end 20, into which threaded end is screwed a clutch element or member 21 bearing upon its face a leather friction disk 22. The stud 17 is provided with a collar 23 to prevent axial displacement of the sleeve or hub 18. The clutch member 21, which rotates with the sleeve 18 has a tubular screw threaded shoulder 24, the hub 20 being counter-bored for the purpose of receiving this screw threaded shoulder and a space is left between the end of the shoulder and the inner extremity of the counter bore of the hub 20. Rotatable upon the end portion 17', of the stud 17, is a sleeve 25, provided with a flange 26 on its rear end for inclusion in the space between the clutch shoulder 21 and the inner extremity of the counter-bore of the hub 20. A clutch member 30 is loosely mounted on the sleeve 25 and is positively secured to the fan blades 29—29' as by the rivets 31, the fan blades being secured to the arms of the yoke 28, as by screws 32. The fan blades are bent into planes parallel with the axis, as at 33, and then radially, so as to bring the blades nearer to the inner surface of the radiator 11. Screwed to the outer threaded terminal of the sleeve 25 is a rectangularly shaped housing 35 having forwardly extending parallel members 36—36 and a transversely extending part 37.

A temperature-responsive, expanding bellows diaphragm 40, containing a suitable expansible fluid and provided with axially positioned projections 41 and 42 is positioned within the housing 35. The projection 41 extends through the yoke 28 of the fan, to support the diaphragm in place therein and the projection 42 extends through the housing member 37 to axially support the outer end of the diaphragm. The hub or sleeve 19 is rotatable upon the stud 17, independently of the fan, and the fan controlling thermostatic device.

As shown in Fig. 2, the fan is in driving relation with the rotatable clutch member 21, the clutch member 30 being held firmly in frictional engaging driving relation therewith by the expanded diaphragm. When the diaphragm is fully expanded, as shown in Fig. 2, its outer end bears against the housing member 37, which tends to pull the sleeve 25 and clutch member 21, outwardly and press the clutch member 30 rearwardly thereby bringing the clutch member 21 and the leather 22, which may be carried by either member, into tight driving relation with the clutch member 30. The rear end of the expanding diaphragm pushes against the yoke 28 causing the clutch member 30 to be forcibly pressed rearwardly into driving relation with the coöperating clutch member 21 in a manner clearly shown by the drawings.

When the air passing through the radiator, and moved by the fan is of a temperature sufficient to expand the temperature responsive medium, within the expanding diaphragm chamber 40, the clutch members are thereby brought into driving relation and the fan is rotated. The rotation of the fan causes a strong blast of air to be forcibly drawn through the radiator and therefore the temperature of the contained water is reduced, by the more rapid carrying away of its heat. When the temperature of the water drops below a predetermined value the temperature of the air passing through the radiator is correspondingly decreased causing contraction of the diaphragm 40, thereby separating the clutch members 21 and 30, to such extent as to cause more or less slip between said engaging clutch members, thus reducing the speed of the fan. When contraction of the expanding medium within the diaphragms is sufficient, an entire separation of the clutch members is produced, thereby causing the fan to stop, notwithstanding the continued rotation of the clutch member 21.

By this means the speed of the fan is regulated proportional to the temperature of the circulating water, or entirely stopped, when the temperature of the air has been sufficiently reduced.

The stationary stud 17 is preferably hollow, as at 44, to provide an oil way with outlets 45 and 46 and inlet 47. The first mentioned outlets are to supply oil for the pulley 18 and the sleeve 25 and the latter to provide an inlet for the oil from the cup 48.

It is evident that other temperature responsive devices than that shown may be employed for controlling the fan operation for the embodiment shown and described.

While I have herein shown two embodiments of my invention, it will be manifest to persons skilled in the art, that there are many other forms and deviations which my invention may take without departing from the scope of the appended claims.

Having described my invention, what I claim:—

1. In combination with an air moving rotatable fan, means for driving the fan, a clutch for connecting the fan and driving means, and temperature-responsive means carried by the fan for actuating the clutch.

2. The combination with an automobile radiator, of a fan adapted to draw air therethrough, a rotatable drive pulley, a clutch between said fan and pulley, and temperature responsive means positioned between the radiator and fan for actuating the clutch.

3. The combination with an automobile radiator, of a fan adapted to draw air therethrough, a rotatable drive pulley, a clutch between said fan and pulley, and temperature responsive means carried by the fan and positioned between the radiator and fan for actuating the clutch.

4. In combination, an internal combustion engine, a water cooling radiator for the circulating water thereof, having air passages therethrough, a fan between said radiator and engine for drawing air through said passages to cool the water, a variable-speed clutch operable by said engine for driving the fan, and a temperature-responsive device located between said fan and radiator for operating said clutch to vary the speed of the fan as air temperature varies and to completely disconnect the clutch from the fan when the temperature falls to a predetermined degree.

5. In combination, an internal combustion engine, a water cooling radiator for the circulating water thereof having air passages therethrough, a fan between said radiator and engine for drawing air through said air passages to cool the water content, a clutch member rotatable by the engine, to drive the fan, a coöperating clutch member, rotatable with the fan, and a temperature-responsive device adjacent the radiator for closing the clutch members at a predetermined temperature.

6. The combination with an air moving fan, of a spindle therefor, a driving member, a clutch connection between the fan and member, a thermostatic device for operating said clutch, a driving member, clutch, fan and thermostatic device all being rotatably mounted on the spindle and locked from axial displacement therefrom.

In testimony whereof I hereunto set my hand in the presence of two subscribing witnesses.

PARKE T. SNYDER.

In the presence of—
STANLEY W. COOK,
MARY F. ALLEN.